United States Patent [19]

Gibson et al.

[11] Patent Number: 4,661,655
[45] Date of Patent: Apr. 28, 1987

[54] ELECTROGRAPHIC TOUCH SENSOR AND METHOD OF REDUCING BOWED EQUIPOTENTIAL FIELDS THEREIN

[75] Inventors: William A. Gibson, Knox County; John E. Talmage, Jr., Anderson County, both of Tenn.

[73] Assignee: Elographics, Inc., Oak Ridge, Tenn.

[21] Appl. No.: 685,348

[22] Filed: Dec. 24, 1984

[51] Int. Cl.⁴ .................... G06K 9/28; G08C 21/00
[52] U.S. Cl. ........................................ 178/18; 382/13
[58] Field of Search ............. 178/18, 19, 20; 382/13, 382/59

[56] References Cited

U.S. PATENT DOCUMENTS 4,493,104  1/1985  Lukis et al. ................... 178/18 X Primary Examiner—Stafford D. Schreyer
Attorney, Agent, or Firm—Pitts and Brittian

[57] ABSTRACT

A resistor electrode type touch sensor having enhanced area of linear response by reducing the bow in perimeters of the sensor and the method of accomplishing the same. A resistive coating is applied to one surface of a substrate. Within this coating orthogonal electrical fields are produced to give coordinates of a selected position. Overlying, but spaced from, the resistive coating is a flexible pick-off sheet having a conductive layer facing the resistive layer which will contact the resistive coating when the pick-off sheet is touched at a selected position. A resistance element is positioned proximate, but insulated from, the perimeter of the resistive coating. Electrodes of a selected effective length and spacing are located along selected paths proximate the edges of the resistive coating. Each electrode is attached to the resistive coating and connected to selected positions along the resistance element to provide selected voltages to the resistive coating. The effective length and spacing of the electrodes, and the positions of connection to the resistance element, are selected to produce an effective voltage gradient at the electrodes that progressively decreases from corners of the sensor to the center line of each edge of the sensor to counteract any voltage drop along the resistance element when potentials are applied thereto so as to substantially eliminate the bow of electrical fields produced in the resistive coating.

20 Claims, 3 Drawing Figures

ELECTROGRAPHIC TOUCH SENSOR AND METHOD OF REDUCING BOWED EQUIPOTENTIAL FIELDS THEREIN

DESCRIPTION

1. Technical Field

The present invention relates to devices for inputting or determining the coordinates of a location in a two-dimensional system, and more particularly to an electrographic touch sensor and a method whereby such points can be determined or selected with good linearity throughout an increased proportion of the area of the sensor.

2. Background Art

There are many fields of technology where it is desirable to generate electrical signals that are proportional to some physical point in a two dimensional planar or non-planar coordinate system. For example, it often desirable to accurately reconstruct graphs or other technical data representation, to store such data in computers, or to provide touch sensors and the like. A device which has come into use for this purpose is known as a electrographic sensor, wherein orthogonal electrical fields are produced, one in a X direction and one in a Y direction, in the coordinate system. Contact of the sensor at a specific location with a finger or other object causes the generation of a signal that is representative of the X and Y coordinates of that particular point.

Orthogonal X and Y electrical fields of the devices of this type have been generated by numerous types of systems. For example, parallel electrodes have been placed on opposite edges on two spaced apart sheets. The electrical field in one direction is generated in one sheet with a voltage applied to the set of electrodes on that sheet, and the orthogonal field is generated in the second sheet in a similar manner. In another configuration, however, the orthogonal electrical fields are generated in a single sheet, with various configurations of electrodes along the edges of the sheet, with the potential applied to these electrodes in a proper time sequence. One group of single sheet sensors utilize resistive-type electrodes in contrast to another group that utilize diodes.

In the single sheet type apparatus using resistive electrodes, it is well recognized that equipotential lines generated by the electrodes in the center of the sheet are generally straight parallel lines in each of the directions. However, as the perimeter of the sheet is approached, these equipotential lines deviate from the ideal by being non-parallel curved lines. The curvature, i.e., bow, is produced by the voltage drop in the resistive electrodes. If a high linearity device is desired, such can be achieved near the center of the device, but not at the edge of the device because of these non-parallel bowed equipotential lines near the edge.

In order to achieve high linearity throughout a larger area of the device, many special systems of electrodes have been devised to increase the region of linearity of the instrument. For example, in U.S. Pat. No. 3,798,370, issued to G. S. Hurst on Mar. 19, 1974, (which patent has a common assignee with this application) electrodes for the application of the voltage to the sheet are arranged in a curve or bow whereby the voltage drops in the resistive element along the edges of the device are at least partially compensated. This is discussed with reference to FIG. 2 therein.

In a like manner, special electrode configurations are shown and described in U.S. Pat. Nos. 4,079,194 issued to V. Kley on Mar. 14, 1978; and in 4,178,481 issued to the same inventor on Dec. 11, 1979. In both of these patents special electrode configurations are used to reduce the bow to increase the effective area of a given sized sensor. Such configurations taught in these patents, however, are difficult to manufacture and are thus expensive to achieve.

Numerous sensors of this general type are utilized for use as an overlay to a video display such as a computer terminal in the form of a cathode ray tube. Such displays have outwardly curved (convex) edges. Using sensors of the prior art, with inwardly extending electrodes, or at least inwardly directed bowed fields on these display devices, the active area of a sensor is less than the potentially available area.

Accordingly, it is a principal object of the present invention to produce an electrographic sensor for determining planar coordinates with high linearity, such sensors having a minimum area devoted to means for generating electrical fields therein.

It is another object of the present invention to provide a sensor which may be used over the screen of video display devices which results in an optimum utilization of the space thereof.

It is another object of the present invention to provide a single sheet sensor that can be inexpensively produced which will substantially reduce, or eliminate, the bow normally found in prior art devices.

These and other objects of the present invention will become apparent upon the consideration of the following description with reference to the drawings referred to therein.

DISCLOSURE OF THE INVENTION

According to the present invention, there is provided a sheet of resistive material having a highly uniform resistivity. This sheet may be either transparent or opaque and is formed using conventional technology. Positioned along and adjacent to this sheet at each edge thereof is a substantially uniform resistive element by which potentials are applied to the sheet. Actual contact between the resistive element and the sheet is provided with a single line of a plurality of contact electrodes connected to the resistive element along each edge, with the size and spacing of these contact electrodes chosen to provide a selected degree of linearity of the response throughout a major area of the device. Specifically, the effective voltage gradient along the line is selected to counteract the bow that otherwise would exist due to voltage drop along the resistive element. The invention further encompasses the method of reducing bowed equalpotential fields at the perimeter of the active area of the sensor.

DETAILED DESCRIPTION OF THE INVENTION

Figure 1:
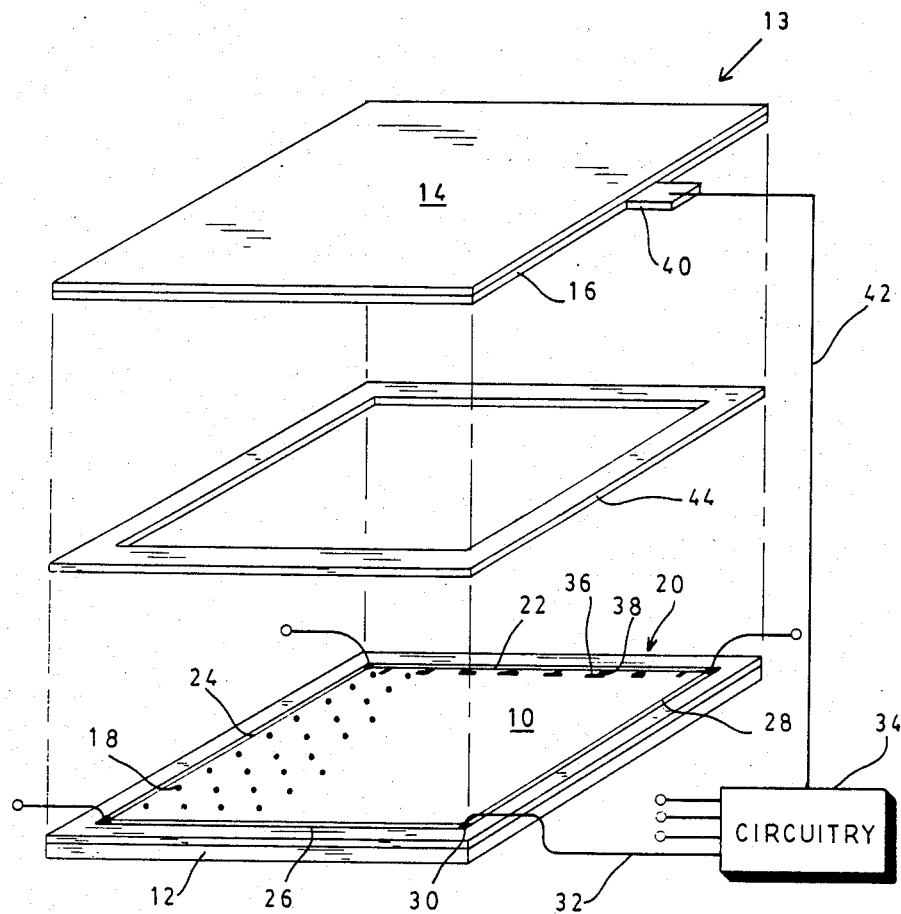
FIG. 1 is an exploded view of a device constructed according to the present invention.

Referring now to FIG. 1, shown therein is an exploded view of a device for accomplishing the above-stated objects. It will be recognized that the thickness (or height) of the components has been exaggerated for purposes of illustration. A uniform resistive surface 10 is applied to a suitable substrate 12. The substrate may be, for example, planar (as shown) or can be contoured to match the face of a curved object, such as a conventional video display screen. The substrate can have any perimeter configuration, e.g., rectangular (as shown) or to match the configuration of a video display which would include being "substantially rectangular". If the resultant product is to be an opaque sensor, the resistive coating is typically applied by screening a resistive ink, by spraying a resistive paint upon the substrate, or may be a volume conducting sheet such as rubber or plastic. The substrate can typically be rigid plastic, glass, various types of printed circuit boards material, or a metal having a previously applied insulating layer. Furthermore, various plastic materials can be utilized in the form of flexible sheets and supported upon a suitable hard surface material. In such opaque units, the resistive coating or sheet typically can have a sheet resistivity between about 10 and 10,000 ohms per square and be applied within a variation of uniformity of about two percent and twenty-five percent, depending upon the positional accuracy requirements of the device.

Alternatively, the resistive coating 10 on substrate 12 can be substantially transparent. For such a device, the resistive layer is typically a semiconducting metal oxide as represented by indium-tin oxide. This type of coating and substrate are described in more detail in U.S. Pat. No. 4,220,815 issued Sept. 2, 1980, which patent is incorporated herein by reference. Typically, this resistive layer has the same range of resistivity as in the opaque sensor described above. The substrate for the transparent sensor is, accordingly, a transparent material such as glass.

Spaced above the resistive coating is a contact or pickoff sheet 13, typically a flexible film 14 having a conductive coating 16 on the underside of the film. If the resultant device is to be transparent, the conductive coating must also be transparent. This transparency requirement does not necessarily apply to a device that is considered an opaque sensor. The flexible film can either be a rigid-like plastic, such as polyester or polycarbonate, or it can be elastomeric. The conductive coating 16 has sufficient flexibility to complement the flexible film and typically has a sheet resistivity less than about 1,000 ohms per square.

Typically the conductive coating 16 on the pickoff sheet is separated from resistive surface by means whereby accidential contact therebetween cannot occur. These means do permit, however, intentional contact at a particular point using a preselected pressure applied at that point. Preferably, the separating means is a plurality of small dots or islands 18 of insulation as described in the aforementioned U.S. Pat. No. 4,220,815. Alternately, fibers, insulating lines, or other separating means can be used (See, for example, U.S. Pat. No. 3,798,370). It will be recognized by those versed in the art that the conductive coating 16 and the resistive coating can be separated solely by an air gap.

Spaced along each edge of the resistive coating 10, but insulated therefrom, is a resistor element 20 used for applying potentials to the resistive layer. This resistor element can be continuous, as shown, or formed of discrete units connected in series. As known to those versed in the art, the value of this resistor element depends upon the value of the resistivity of the coating and thus can vary from about 6 to 6000 ohms per foot for the above-cited range of resistivity. The resistor element is made up of four components 22, 24, 26, and 28, and adjacent ends of each are joined at or near the corners of the resistive coating, as at 30. Each of these corners is provided with an electrical lead, such as 32, whereby the device is connected to conventional circuitry 34 which provides the voltage to the resistor element 20 and which processes information from the device. The elements of this circuitry are well known to those versed in the art.

Along selected paths adjacent each edge of the resistive coating 10, and in contact therewith, are a plurality of electrodes, as at 36. The spacing of the electrodes along each path is chosen so as to achieve varying effective voltage gradients in the resistive coating 10 proximate the electrodes 36 to compensate for the voltage drop along the resistive element. Accordingly, the effective voltage gradients in the coating decrease progressively from corners toward the center of each path as the voltage drop increases along the resistive element 20. These effects (voltage gradient and voltage drop) are made to balance each other so that a substantially straight equipotential exists along a line defining the edges of the active region (having ±0.1 in or better linearity) of the sensor. The voltage gradient differences obtained by this construction occur substantially in the area between the electrodes and the edge of the active area insufficient to produce positional inaccuracies.

The effective voltage gradients are a function of the effective size (effective width facing active area) and spacing of the electrodes. If equal size electrodes are used, the spacing is greatest toward the corners of the sensor and substantially less toward the center of each edge. For fabrication simplicity, namely to reduce the number of connections to the resistive element electrodes can be lengthened toward the center without significantly departing from the ideal. Thus, in FIG. 2, such variation in electrode length is illustrated. As shown, the electrodes closest to the corners have a smaller length dimension, while those more removed from the corners have a longer dimension. Also, the spacing between electrodes is selected to achieve the desired effective voltage gradients, and thus the desired linear response in the operational area of the sensor. Typically the spacing nearest the corners is the largest, with the spacing decreasing toward the center line of each side. Although substantially rectangular electrodes are illustrated, other configurations are suitable, particularly if the electrodes are small in size. These electrodes 36 are individually connected by a lead, as at 38, to the aforementioned resistor element along the corresponding edge. Specific voltage application to each of the electrodes is achieved by the selection of the connection point of the lead 38 on the resistor element 20 such that the desired voltage drop along the resistive element is compensated and the increased effective operative area of the sensor is achieved.

It should be understood that an identical array of electrodes is placed along the opposite edge of the resistive layer, although only one such array is shown in FIG. 1. An electrode array is also applied to the other opposite edges, this array being identical if the device is square. These electrodes typically are physically attached to the resistive surface 10 as by depositing a conductive material, e.g., silver in the appropriate pattern. Furthermore, the device includes an electrode such as at 40, whereby the conductive layer 16 of the aforementioned pickoff sheet 13 can be connected through lead 42 to appropriate external circuitry (as within circuitry 34) for use with the device. The pickoff sheet 13 is typically joined to the remainder of the device with an insulative adhesive frame 44 or the like.

Figure 2:
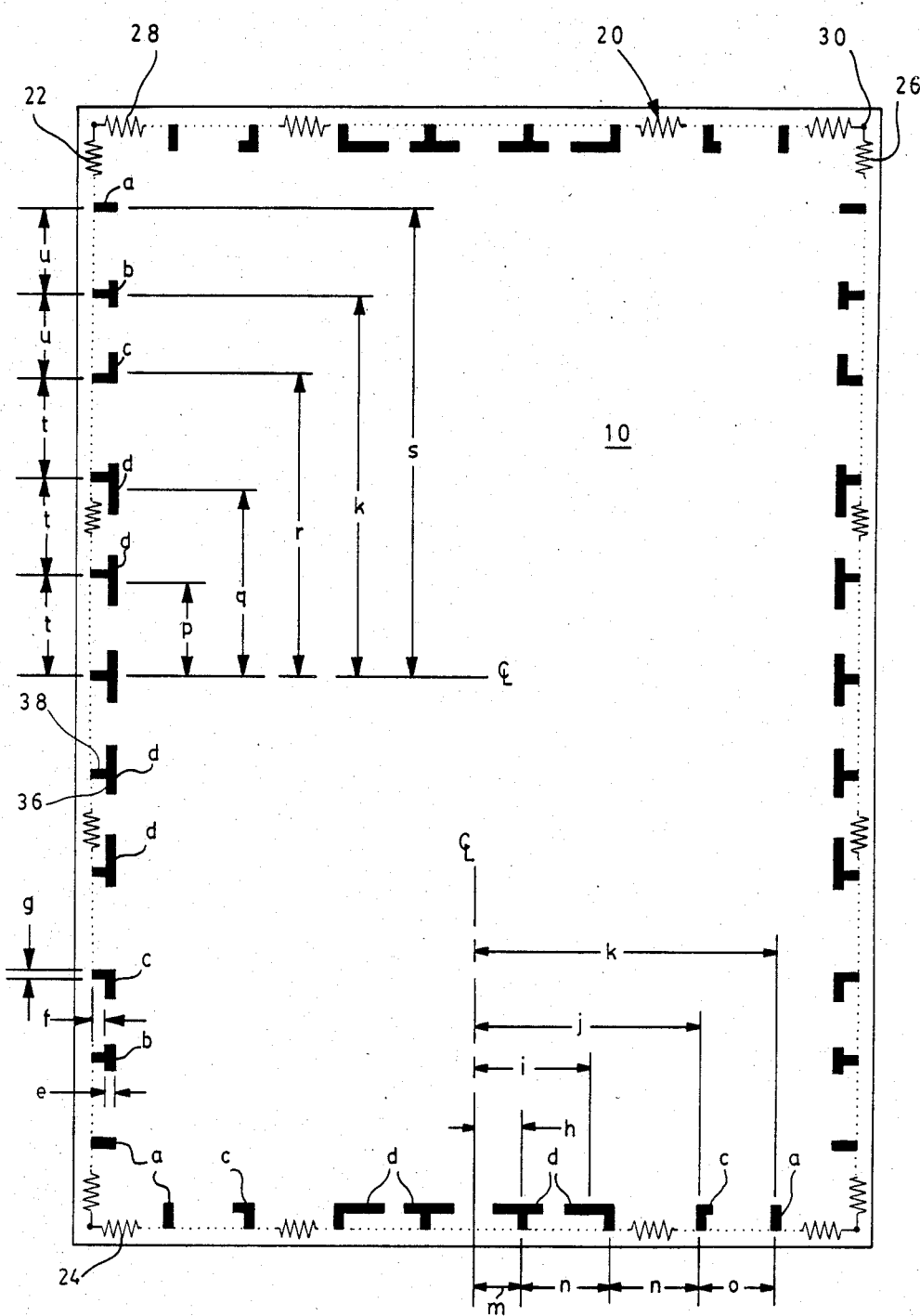
FIG. 2 is a drawing illustrating one embodiment of the application of electrodes of varying sizes and spacing to achieve the present invention.

Referring now to FIG. 2, shown therein is an electrode configuration for specifically, achieving positional accuracy of about ±0.1 inch throughout the entire active region that approaches the electrodes. This unit was constructed to produce an active area of thirteen (13) inches diagonally. Its purpose was for utilization on a thirteen (13) inch video display screen. As shown, the resistive coating 10 had a rectangular configuration for use in this application. The specific sheet resistivity of this coating for this embodiment was about 200 ohms per square. Spaced near the edges of the resistive coating 10, but insulated therefrom, was a resistance element 20 of Nichrome wire of about 2.3 mils diameter, which wire had a linear resistance of about 130 ohms per foot. As indicated previously in FIG. 1, the sections of resistance wire were joined at the corners of the unit as at junction 30. It will be recognized by persons skilled in the art that the resistance value of the elements immediately adjacent the corners can be adjusted to obtain the proper linearity in the corners of the active area. This adjustment is not shown in this figure. The resistance element 20 was made up of the segments 22, 24, 26, and 28. Applied to the resistive coating 10 were a plurality of electrodes 36 positioned and sized so as to be symmetrical about the center lines of the sides of the unit. Each of these electrodes was connected with a lead 38 to the appropriate segments of the resistance element 20, (e.g., 22). Four sizes (lengths) of electrodes were utilized in this embodiment. These electrodes are designated a, b, c, and d in the drawing. As stated above, electrodes of uniform length can be used; however, the elongated electrodes approximates a similar result and reduces the number of connections to the resistive element. The dimensions of these specific electrodes and their approximate spacing are shown in the following table. In addition, the approximate spacing of the electrical leads connecting each of the electrodes to the resistance element 20 are also shown in the table.

TABLE

| a (length) = | 0.06 inches | k = | 3.8 inches |
|---|---|---|---|
| b (length) = | 0.1 inches | m = | 0.5 inches |
| c (length) = | 0.1 inches | n = | 1.0 inches |
| d (length) = | 0.5 inches | o = | 1.25 inches |
| e = | 0.06 inches | p = | 0.8 inches |
| f = | 0.06 inches | q = | 1.65 inches |
| g = | 0.06 inches | r = | 2.75 inches |
| h = | 0.45 inches | s = | 5.0 inches |
| i = | 1.3 inches | t = | 0.9 inches |
| j = | 2.5 inches | u = | 1.2 inches |

Figure 3:
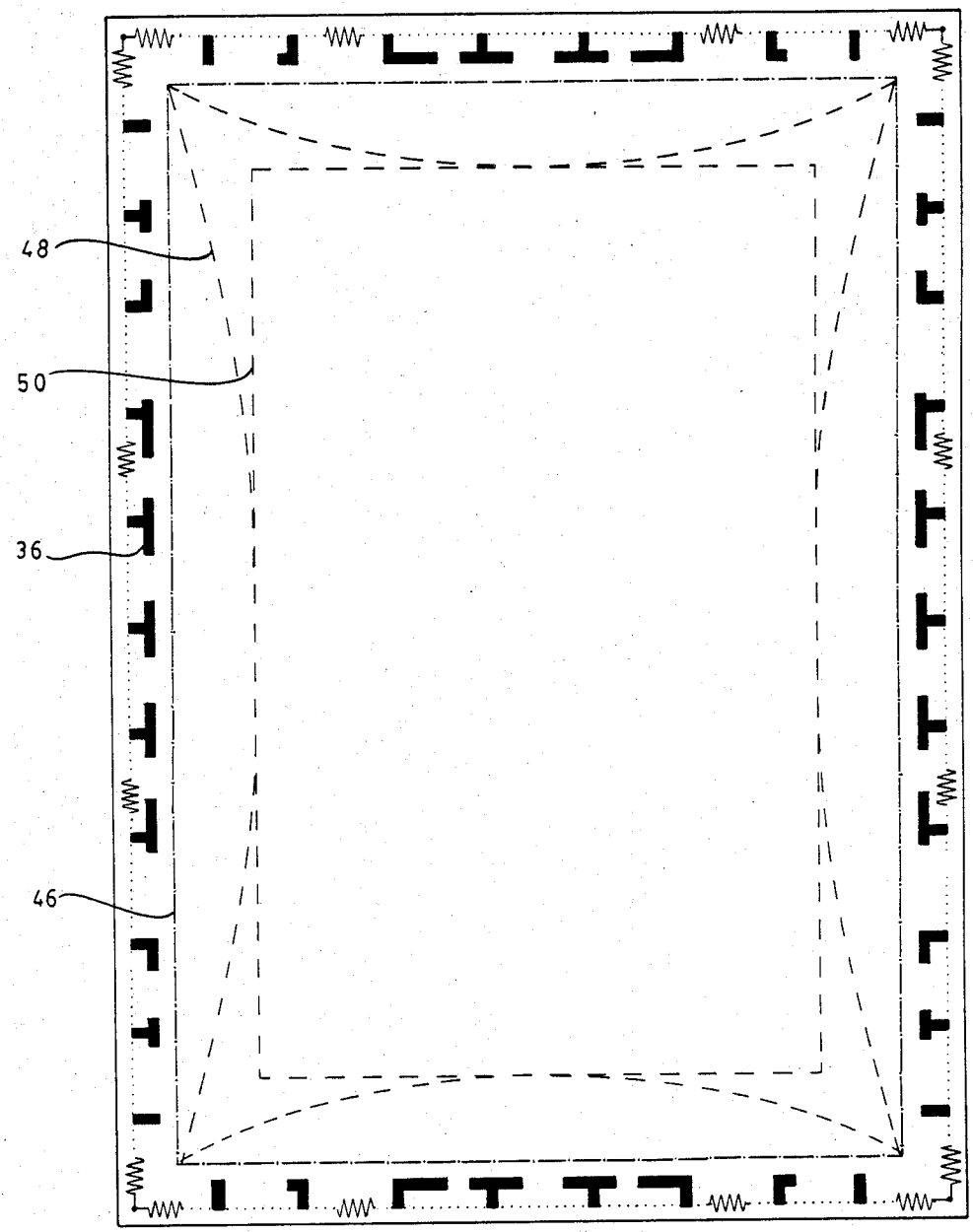
FIG. 3 is a drawing illustrating the enhancement of the active area of a sensor as achieved with the present invention contrasted with typical sensors of the prior art.

A touch sensor constructed utilizing the electrode configuration identified above was tested for determining positional accuracy (linearity). The unit was constructed as generally illustrated in FIG. 1. The conductive layer of the pick-off sheet had a resistivity of 300 ohms per square in this particular embodiment. It was determined that the resultant sensor had a positional accuracy of about ±0.1 inch through the entire active or operational region of the sensor, with the active area approaching the electrodes. The result may be contrasted with results using the bowed orientation of electrodes as set forth in the aforementioned U.S. Pat. No. 3,798,370. In that construction and using the resistances discussed herein, there would have been a bow in the electrode configuration of about 1.75 inches in the long dimension of the sensor and almost an one-inch bow in the shorter dimension. The amount of bow is proportional to the ratio of the resistance of the wire (or its equivalent) divided by the resistance of the sheet, multiplied by the square of the length of the side. Thus, for the same size of total sensor structure of the prior art it would have an effective active area of only about eight inches diagonally instead of the thirteen inches as demonstrated by the present invention. This comparison is illustrated in FIG. 3. The active area of the present invention is indicated by the dashed line 46. Without this invention, there would be a bow as indicated at 48, and the active area would be defined by the dashed rectangle 50.

As indicated above, the number of the electrodes utilized along an edge of a sensor is generally proportional to the length of that edge. The specific size, number and spacing is selected to compensate for the voltage drop along the resistive element during operation of the sensor. Thus, the actual values are dependent upon the specific resistance of the resistive element to produce the fields in the sensor. The selected voltage necessary to accomplish the optimum linearity can be "fine tuned", if needed, by changing the point at which each of the electrodes is connected to the resistive element 20. This can be utilized to adjust for any minor inaccuracies that occur during the fabrication techniques in applying small electrodes to exact locations.

In all of the figures, the electrodes along each edge are shown as being aligned in a straight path. This is only, however, a most general construction. An alternate convex path can be used to match, for example, the aforementioned curvature along the edges of a conventional computer video display. With such a convex path of electrodes, such electrodes would be hidden behind the bezel of the display. The effective voltage gradient would be adjusted in the same manner to provide an enlarged linear area.

From the foregoing, it may be seen that a position sensitive device has been achieved having increased positional accuracy (linearity) over a greater portion of a device of given size. This permits the fabrication of a smaller device for a given area of uniform sensitivity. Although only one specific embodiment is described herein, it will be recognized by persons versed in the art that the teachings contained herein will permit the fabrication of other devices which will perform as described. Furthermore, the method of eliminating or reducing bowed equipotenetial lines at the perimeter of the active area of the sensor will be understood by persons skilled in the art upon a consideration of this description. Accordingly, this invention is limited only by the claims and equivalents of the claims that are appended hereto.

We claim:

1. A position touch sensor having resistive electrodes which provides a substantially linear response over the total area of said sensor by substantially reducing the bow of equipotential lines along the edges of said sensor, said equipotential lines produced when electric fields are introduced into said sensor, which comprises:

a substrate having an upper and a lower face, said substrate defining a perimeter of a selected configuration;

a uniform resistive coating applied to said upper face of said substrate, said coating covering a substantial portion of said upper face and defining perimeter edges of said coating;

resistance elements positioned proximate each of said perimeter edges of said coating, each of said resistance elements having opposite ends joined to proximate ends of adjoining resistance elements, said resistance elements being insulated from said coating;

a plurality of electrodes positioned along a preselected symmetrical path along each perimeter edge of said coating and electrically attached to said coating, said electrodes each being electrically connected to selected positions along said resistance elements to introduce orthogonal electric fields into said coating, said electrodes having a selected spacing and an effective length along said path;

said spacing and effective length of said electrodes selected to produce a selected voltage gradient at each of said electrodes to compensate for any cumulative voltage drop along said resistance elements perpendicular to current flow through said coating during operation of said sensor when said orthogonal fields are applied to said coating whereby said bow of said equipotential lines is substantially reduced.

2. The sensor of claim 1 wherein said paths are straight lines.

3. The sensor of claim 1 wherein said paths are symmetrical convex curves.

4. A position touch sensor utilizing resistive electrodes which provides a substantially linear response over the surface area of said sensor by substantially reducing the bow of equipotential field lines produced proximate said electrodes during application of electric fields to said sensor, which comprises:

a substantially rectangular substrate having a top surface and a bottom surface, said substrate defining a first pair of opposite edges of a first dimension and a second pair of opposite edges of a second dimension at substantially right angles to said first pair of edges;

a uniform resistive coating deposited upon a substantial portion of said top surface of said substrate;

a resistance element positioned proximate each one of said first pair and second pair of opposite edges of said substrate and insulated from said resistive coating, said resistance elements joined at ends thereof to form a substantially rectangular array of resistance elements surrounding said coating;

a plurality of electrodes located along a selected path, electrically attached to said resistive coating proximate each of said first and second pair of opposite edges of said substrate, each electrode having a selected effective length along said selected path and a selected spacing from an adjacent electrode in said path;

a plurality of electrical connectors, each one of said connectors electrically connecting one of said electrodes to a selected position on adjacent of said resistance elements to supply orthogonal fields to said coating through said electrodes during sensor operation;

said effective length and spacing of said electrodes selected to produce a selected voltage gradient at each of said electrodes to compensate for any voltage drop along said resistive elements perpendicular to current flow through said coating during operation of said sensor, said selected effective length of said electrodes in said path increasing, and said selected spacing between adjacent electrodes decreasing, from each end of said path toward a centerline of said path to thereby progressively decrease said voltage gradients produced by said electrodes in said coating toward said centerline to compensate for progressively increasing cumulative voltage drop in said resistance elements, whereby said bow of said equipotential lines is reduced.

5. The senosr of claim 4 wherein said first dimension is larger than said second dimension, and wherein each of said first pair of said electrode element groups contains a greater number of electrodes than each of said second pairs of said electrode element groups.

6. The sensor of claim 1 wherein said selected effective length of said electrodes in each of said paths increases from about 0.06 inch at each end to about 0.5 inches at said centerline, with said electrodes having a dimension perpendicular to said path of about 0.06 inch.

7. The sensor of claim 6 wherein said selected spacing of said electrodes in each of said paths decreases from about 1.3 inches at each end to about 0.8 inch at said centerline.

8. The sensor of claim 1 wherein said electrodes are substantially rectangular, and said paths are substantially straight lines.

9. The sensor of claim 4 wherein said electrodes are substantially rectangular, and said paths are substantially straight lines.

10. The sensor of claim 1 further comprising a flexible pick-off sheet uniformly spaced from said resistive coating, and proximate thereto, said sheet having a conductive layer facing said resistive coating, and means for preventing inadvertant contact between said conductive layer and said resistive coating but permitting intentional contact therebetween.

11. The sensor of claim 10 wherein said means for preventing inadvertant contact between said conducting layer of said pick-off sheet and said resistive coating comprises a plurality of small insulating islands attached to said resistive coating.

12. The sensor of claim 10 further comprising a flexible pick-off sheet uniformly spaced from said resistive coating, and proximate thereto, said sheet having a conductive layer facing said resistive coating, and means for preventing inadvertant contact between said conductive layer and said resistive coating but permitting intentional contact therebetween.

13. The sensor of claim 10 wherein said means for preventing inadvertant contact between said conducting layer of said pick-off sheet and said resistive coating comprises a plurality of insulating islands attached to said conducting layer.

14. The sensor of claim 1 further comprising circuit means connected to said juncture of ends of adjoining resistance elements, said circuitry providing potentials across appropriate of said resistance elements to produce said orthogonal equipotential field in said resistive coating.

15. The sensor of claim 10 further comprising circuitry connected to said conductive layer of said pick-off sheet for receiving electrical signals generated in said conductive layer when said conductive layer is touched to a specific point on said resistive coating, said signals corresponding to coordinates of said specific point.

16. The sensor of claim 12 further comprising circuitry connected to said conductive layer of said pick-off sheet for receiving electrical signals generated in said conductive layer when said conductive layer is touched to a specific point on said resistive coating, said signals corresponding to coordinates of said specific point.

17. The sensor of claim 4 further comprising circuit means connected to said juncture of ends of adjoining resistance elements, said circuitry providing potentials across appropriate of said resistance elements to produce said orthogonal equipotential fields in said resistive coating.

18. A single sheet resistor type touch sensor which exhibits substantially reduced bow of electric equipotential lines along edges thereof, said equipotential lines produced when electric fields are introduced into said sensor, which comprises:
   a substantially rectangular substrate having an upper and a lower face, said substrate defining perimeter edges joined at corners;
   a uniform resistive coating applied to a substantial portion of said upper face of said substrate, said resistive coating having a resistivity of between about 10 and about 10,000 ohms per square;
   a resistance element proximate each of said perimeter edges of said substrate, said resistance elements insulated from said resistive coating and having a resistance of about 6 to 6,000 ohms per foot, each resistance element joined to ends of adjoining resistance elements proximate said corners of said substrate;
   circuitry attached to the junctions of said resistance elements for providing potentials across said resistance elements to produce orthogonal electric fields in said resistive coating;
   a plurality of conductive electrodes, aligned in a row proximate said perimeter edges, applied to said resistive coating and electrically joined to said resistive coating, said electrodes having a spacing and an effective length along said row whereby each said electrode produces a voltage gradient in said resistive coating which progressively decrease in value from proximate said corners to centerlines of said row to counteract an increasing voltage drop along said resistance elements due to current flow to said electrodes resulting from said applied potentials from said circuitry and thereby substantially reduce any bow in electrical equipotential lines produced in said resistive coating by said applied potentials to said resistance elements.

19. The sensor of claim 18 further comprising a flexible pick-off sheet spaced uniformly from and proximate said resistive coating, said pick-off sheet having a conductive layer of less than about 1000 ohms per square facing said resistive coating and a plurality of small insulating dots interposed between said resistive coating and said conductive layer to prevent inadvertant contact therebetween but permit contact when pressure is intentionally applied to said pick-off sheet.

20. A method of substantially eliminating any bow in the equipotential lines at the perimeter of a touch sensor of the type having a uniform resistive coating applied to a substantial portion of a substrate and having a resistance element positioned adjacent edges of said resistive coating whereby electric fields can be produced in said resistive coating by connecting selected positions along said resistance element to electrodes on said resistive coating and applying potentials to said resistance element, which comprises:
   positioning said electrodes on said resistive coating along selected paths adjacent said edges of said resistive coating, said electrodes electrically connected to said coating;
   selecting spacing between adjacent electrodes and effective lengths of said electrodes along said paths such that voltage gradients are produced within said resistive coating at each of said electrodes, which voltage gradients compensate for voltage drops along said resistance element when said potentials are applied to said resistance element, said voltage gradients progressively decreasing in value from each end of said path toward a center point of said path and thereby eliminate said bow in said equipotential lines at said perimeter of said sensor.

* * * * *

REEXAMINATION CERTIFICATE (3109th)
United States Patent [19]
Gibson et al.

[11] B1 4,661,655
[45] Certificate Issued Jan. 21, 1997

[54] ELECTROGRAPHIC TOUCH SENSOR AND METHOD OF REDUCING BOWED EQUIPOTENTIAL FIELDS THEREIN

[75] Inventors: William A. Gibson, Knox County; John E. Talmage, Jr., Anderson County, both of Tenn.

[73] Assignee: Elographics, Inc., Oak Ridge, Tenn.

Reexamination Request:
No. 90/003,924, Aug. 25, 1995

Reexamination Certificate for:
Patent No.: 4,661,655
Issued: Apr. 28, 1987
Appl. No.: 685,348
Filed: Dec. 24, 1984

[51] Int. Cl.⁶ .............................. G08C 21/00; G06K 9/28
[52] U.S. Cl. .............................................. 178/18; 382/315
[58] Field of Search .................................. 178/18, 19, 20, 178/87; 395/173, 179, 156, 175; 391/5; 382/312, 313, 315

[56] References Cited

U.S. PATENT DOCUMENTS

| | | | |
|---|---|---|---|
| 3,632,874 | 1/1972 | Malavard et al. | 178/18 |
| 3,798,370 | 3/1974 | Hurst | 178/18 |
| 3,911,215 | 10/1975 | Hurst et al. | 178/18 |
| 4,071,689 | 1/1978 | Talmage et al. | 178/18 |
| 4,085,302 | 4/1978 | Zenk et al. | 200/5 A |
| 4,198,539 | 4/1980 | Pepper, Jr. | 178/18 |
| 4,220,815 | 9/1980 | Gibson et al. | 178/18 |
| 4,493,104 | 1/1985 | Lukis et al. | 382/13 |

*Primary Examiner*—Curtis Kuntz

[57] ABSTRACT

A resistor electrode type touch sensor having enhanced area of linear response by reducing the bow in perimeters of the sensor and the method of accomplishing the same. A resistive coating is applied to one surface of a substrate. Within this coating orthogonal electrical fields are produced to give coordinates of a selected position. Overlying, but spaced from, the resistive coating is a flexible pick-off sheet having a conductive layer facing the resistive layer which will contact the resistive coating when the pick-off sheet is touched at a selected position. A resistance element is positioned proximate, but insulated from, the perimeter of the resistive coating. Electrodes of a selected effective length and spacing are located along selected paths proximate the edges of the resistive coating. Each electrode is attached to the resistive coating and connected to selected positions along the resistance element to provide selected voltages to the resistive coating. The effective length and spacing of the electrodes, and the positions of connection to the resistance element, are selected to produce an effective voltage gradient at the electrodes that progressively decreases from corners of the sensor to the center line of each edge of the sensor to counteract any voltage drop along the resistance element when potentials are applied thereto so as to substantially eliminate the bow of electrical fields produced in the resistive coating.

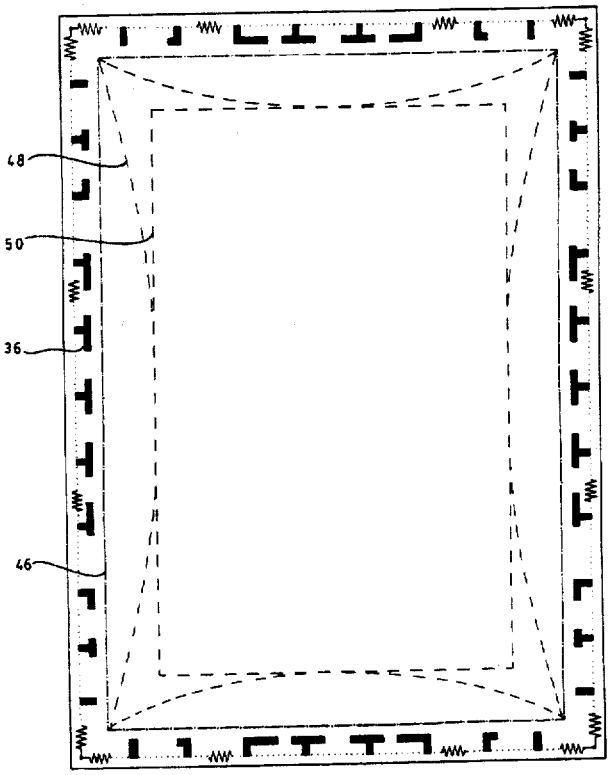

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *